(12) United States Patent
Narita

(10) Patent No.: US 12,387,148 B2
(45) Date of Patent: Aug. 12, 2025

(54) STORAGE MEDIUM, MACHINE LEARNING METHOD, AND MACHINE LEARNING DEVICE

(71) Applicant: FUJITSU LIMITED, Kawasaki (JP)

(72) Inventor: Kenichirou Narita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 960 days.

(21) Appl. No.: 17/511,740

(22) Filed: Oct. 27, 2021

(65) Prior Publication Data

US 2022/0215297 A1 Jul. 7, 2022

(30) Foreign Application Priority Data

Jan. 5, 2021 (JP) ................................ 2021-000550

(51) Int. Cl.
*G06N 20/20* (2019.01)
*G06F 18/20* (2023.01)
*G06F 18/21* (2023.01)
*G06F 18/23* (2023.01)
*G06F 18/2323* (2023.01)
*G06N 3/02* (2006.01)
*G06N 3/08* (2023.01)
(Continued)

(52) U.S. Cl.
CPC ......... *G06N 20/20* (2019.01); *G06F 18/2323* (2023.01); *G06F 18/285* (2023.01); *G06N 3/02* (2013.01); *G06V 10/751* (2022.01); *G06F 18/217* (2023.01); *G06F 18/23* (2023.01); *G06N 3/08* (2013.01); *G06N 20/00* (2019.01); *G06V 10/762* (2022.01); *G06V 10/776* (2022.01); *G06V 10/98* (2022.01)

(58) Field of Classification Search
CPC .......... G06N 20/20; G06N 3/02; G06N 20/00; G06N 3/08; G06F 18/2323; G06F 18/285; G06F 18/217; G06F 18/23; G06V 10/751; G06V 10/762; G06V 10/776; G06V 10/98
See application file for complete search history.

(56) References Cited

U.S. PATENT DOCUMENTS

| 2017/0091669 A1 | 3/2017 | Kuromatsu et al. |
| 2018/0121815 A1 | 5/2018 | Lamparter et al. |

(Continued)

FOREIGN PATENT DOCUMENTS

| JP | 2017-068710 A | 4/2017 |
| JP | 2018-513490 A | 5/2018 |

*Primary Examiner* — Quoc A Tran
(74) *Attorney, Agent, or Firm* — Fujitsu Intellectual Property Center

(57) ABSTRACT

A storage medium storing a machine learning program that causes a computer to execute a process, the process includes specifying first distribution of a feature of data calculated by a second machine learning model; determining whether or not output accuracy of the second machine learning model decreases based on the first distribution; when the determining determines that the output accuracy decreases, selecting, from the plurality of machine learning models, a fourth machine learning model that has second distribution of a feature of data input that is the most similar with third distribution of a feature of the training data among the plurality of the machine learning model, and generating the third machine learning model by updating a parameter of the fourth machine learning model based on a certain piece of the training data labeled based on the feature of the data.

9 Claims, 14 Drawing Sheets

(51) Int. Cl.
*G06N 20/00* (2019.01)
*G06V 10/75* (2022.01)
*G06V 10/762* (2022.01)
*G06V 10/776* (2022.01)
*G06V 10/98* (2022.01)

(56) References Cited

U.S. PATENT DOCUMENTS

| | | | |
|---|---|---|---|
| 2018/0285772 A1 | 10/2018 | Gopalan | |
| 2018/0356807 A1* | 12/2018 | Honda | G05B 19/41885 |
| 2021/0012228 A1* | 1/2021 | Yaguchi | G06F 11/3466 |
| 2021/0406978 A1* | 12/2021 | Subramanian | G06N 3/08 |

* cited by examiner

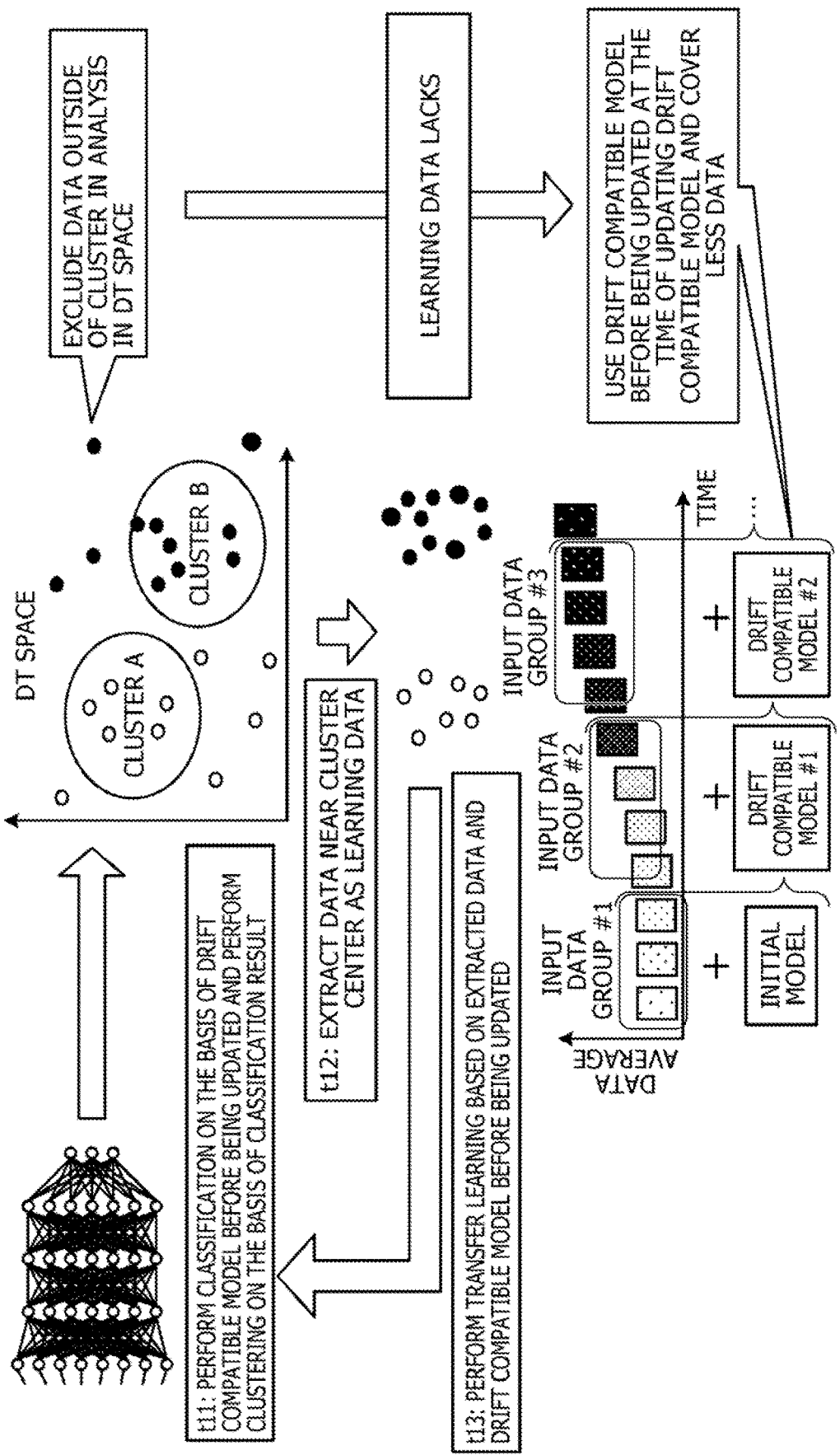

FIG. 8

| HDL INFORMATION ||| MODEL IDENTIFIER |
|---|---|---|---|
| DATA AMOUNT | DENSITY INFORMATION | CLUSTER CENTER COORDINATES | |
| 300 | {0.823,0.74} | {(0.3,0.5),(0.7,0.2)} | model20200618.model |
| ... | ... | ... | ... |

SUDDEN DRIFT

GRADUAL DRIFT

INCREMENTAL DRIFT

STORAGE MEDIUM, MACHINE LEARNING METHOD, AND MACHINE LEARNING DEVICE

CROSS-REFERENCE TO RELATED APPLICATION

This application is based upon and claims the benefit of priority of the prior Japanese Patent Application No. 2021-550, filed on Jan. 5, 2021, the entire contents of which are incorporated herein by reference.

FIELD

The embodiments discussed herein are related to a storage medium, a machine learning method, and a machine learning device.

BACKGROUND

In a case where classification, prediction, or the like is performed on the basis of a machine learning model created using training data, accuracy may be deteriorated due to concept drift after an operation is started. Here, the concept drift means that data distribution changes between the training data used when the machine learning model is trained and data to be input after the operation is started.

FIGS. 12A, 12B, and 12C are diagrams for explaining the concept drift. As illustrated in FIGS. 12A, 12B, and 12C, the concept drift includes sudden drift (sudden drift), gradual drift (gradual drift), and incremental drift (incremental drift). The sudden drift is drift in which data distribution suddenly changes. The gradual drift is drift in which data distribution gradually changes. The incremental drift is drift in which data distribution incrementally changes. In the incremental drift of the concept drift, since data gradually changes, detection is particularly difficult.

In order to suppress deterioration in accuracy of a machine learning model due to change across the ages in the data distribution, the machine learning model is regularly retrained. However, it is not realistic to update an operation model itself in operation in a system through retraining in consideration of a stable operation of the system. Therefore, the operation model and an update model are prepared in parallel. The initial update model is created by copying the operation model. The update model is updated so as to be compatible with the concept drift. The update model is updated, for example, regularly, and the plurality of update models may be generated in chronological order. Then, by appropriately replacing the operation model with the update model, the accuracy deterioration is suppressed.

Note that, as related art, there is a technique for retraining a learning model with post drift process data in a case where concept drift is included for a machine learning model for an automation system trained with process data including context of an automation process.

Furthermore, there is related art that prevents deterioration in accuracy of a prediction processing result using a learning model caused by a mismatch between timings of input data and the learning model in a case where the learning model is updated according to a property change of the input data in stream processing. Here, the stream processing is processing for returning a processing result to real-time input data in a timely manner.

Furthermore, as related art, there is a technique that calculates data distribution of training datasets, calculates a likelihood that new data follows the calculated data distribution, and retrains a machine learning model in a case where the number of times when the calculated likelihood is smaller than a first threshold exceeds a second threshold.

Japanese National Publication of International Patent Application No. 2018-513490, Japanese Laid-open Patent Publication No. 2017-068710, and U.S. Patent Application Publication No. 2018/0285772 are disclosed as related art.

SUMMARY

According to an aspect of the embodiments, a storage medium storing a machine learning program that causes a computer to execute a process, the process includes specifying first distribution of a feature of data calculated by a second machine learning model; determining whether or not output accuracy of the second machine learning model decreases based on the first distribution; when the determining determines that the output accuracy decreases, selecting, from the plurality of machine learning models, a fourth machine learning model that has second distribution of a feature of data input that is the most similar with third distribution of a feature of the training data among the plurality of the machine learning model, and generating the third machine learning model by updating a parameter of the fourth machine learning model based on a certain piece of the training data labeled based on the feature of the data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A is a first diagram for explaining a plurality of models managed by a model management unit;

FIG. 8 is a diagram illustrating an example of a past model storage unit;

DESCRIPTION OF EMBODIMENTS

By preparing an update model of which a parameter of a model is updated on the basis of data in operation for an operation model and switching to the update model in a case where the accuracy of the operation model is deteriorated due to the concept drift, it is possible to suppress the accuracy deterioration. At that time, in order to follow the concept drift, it is preferable to perform update on the basis of newer data. Therefore, the update model is updated on the basis of the latest data, and the operation model is replaced with the updated update model. However, there is a problem in that the operation model of which the accuracy is deteriorated is continuously used if processing for updating the update model takes time.

Figure 13:
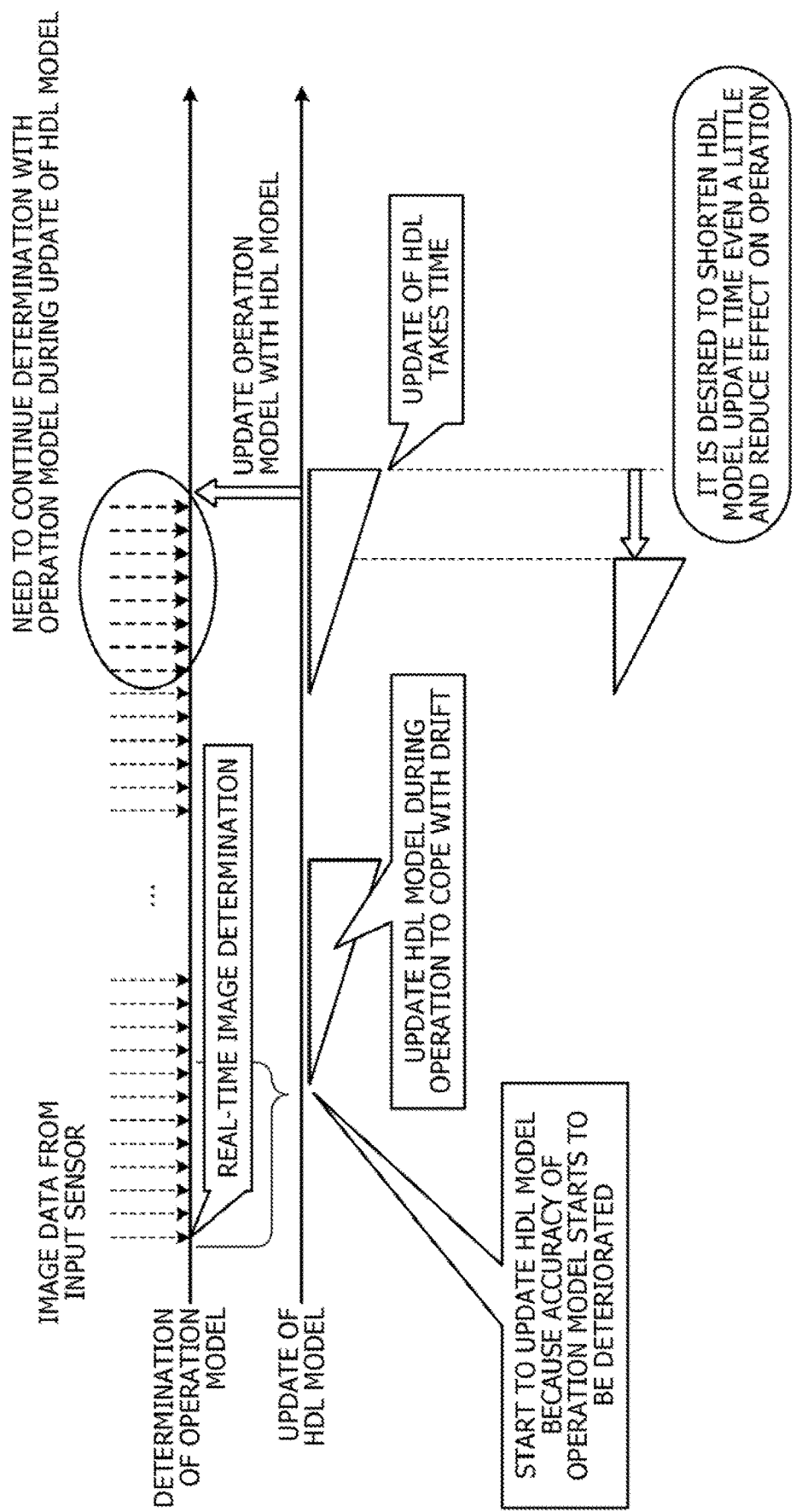
FIG. 13 is a diagram for explaining a problem of continuously using an operation model of which accuracy is deteriorated because processing for updating an HDL model takes time.

FIG. 13 is a diagram for explaining a problem of continuously using an operation model of which accuracy is deteriorated because processing for updating an update model takes time. FIG. 13 illustrates a case where an image is determined in real time. As illustrated in FIG. 13, the real-time image determination is performed on image data from an input sensor on the basis of the operation model.

When the accuracy of the operation model is deteriorated, update of the update model is started, and the update model is updated during operation. Then, when update of the operation model is determined after the update model has been updated several times, the update model is finally updated, and the operation model is updated with the finally updated update model. However, if the update of the update model takes time, the operation model before being updated is continuously used until the final update of the update model is completed and the operation model is updated.

One aspect of the present embodiment is to shorten an update time of an update model.

Hereinafter, embodiments of a machine learning program, a machine learning method, and a machine learning device disclosed in the present application will be described in detail with reference to the drawings. Note that the embodiments do not limit the technology disclosed.

First Embodiment

Figure 1:
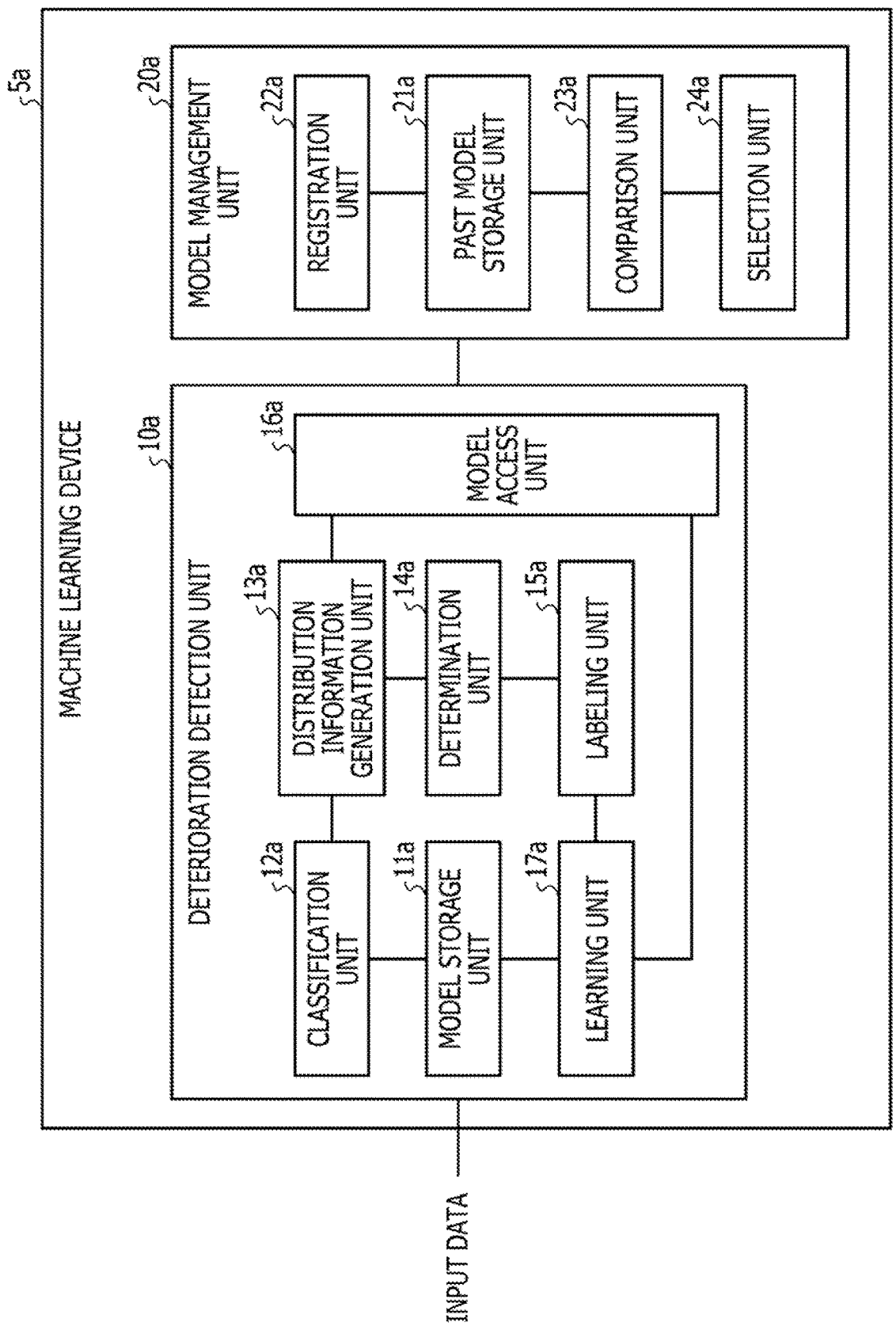
FIG. 1 is a diagram illustrating a functional configuration of a machine learning device according to a first embodiment.

FIG. 1 is a diagram illustrating a functional configuration of a machine learning device 5a according to a first embodiment. As illustrated in FIG. 1, the machine learning device 5a includes a deterioration detection unit 10a and a model management unit 20a. The deterioration detection unit 10a detects deterioration of an operation model and updates the operation model when detecting the deterioration of the operation model. Here, the operation model is a machine learning model in operation. The deterioration detection unit 10a copies the operation model and stores the operation model as a drift compatible model. Then, the deterioration detection unit 10a updates the drift compatible model on the basis of input data. Then, when the operation model is deteriorated, the deterioration detection unit 10a copies the drift compatible model to the operation model.

The model management unit 20a manages the drift compatible model in association with a distribution of feature of the input data (hereinafter, referred to as "input data distribution"). The model management unit 20a manages all models used by the deterioration detection unit 10a as drift compatible models.

The deterioration detection unit 10a includes a model storage unit 11a, a classification unit 12a, a distribution information generation unit 13a, a determination unit 14a, a labeling unit 15a, a model access unit 16a, and a learning unit 17a. The model management unit 20a includes a past model storage unit 21a, a registration unit 22a, a comparison unit 23a, and a selection unit 24a.

The model storage unit 11a stores the drift compatible model. Specifically, for example, the model storage unit 11a stores a parameter of a neural network as a drift compatible model. The parameter includes weights between neurons. The weights between the neurons are updated through learning.

The classification unit 12a classifies input data on the basis of the drift compatible model stored in the model storage unit 11a.

The distribution information generation unit 13a generates an input data distribution for a predetermined number (for example, 300) of pieces of input data.

The determination unit 14a determines whether or not the drift compatible model needs to be updated and instructs the learning unit 17a to perform learning in a case of determining that the update is needed. The determination unit 14a, for example, determines whether or not the drift compatible model needs to be updated on the basis of a ratio at which a classification result by the classification unit 12a matches a correct answer specified by a user.

In a case where the determination unit 14a determines that the drift compatible model needs to be updated, the labeling unit 15a creates training data by adding a label (correct answer) to the input data. Then, the labeling unit 15a transfers the created training data to the learning unit 17a.

The model access unit 16a accesses the model management unit 20a. The model access unit 16a specifies the input data distribution generated by the distribution information generation unit 13a, inquires a model similar to the input data distribution to the model management unit 20a, and transfers the information regarding the model acquired from the model management unit 20a as a response, to the learning unit 17a.

Furthermore, the model access unit 16a requests the model management unit 20a to register the input data distribution generated by the distribution information generation unit 13a and the information regarding the drift compatible model generated by the learning unit 17a in association with each other.

The learning unit 17a performs learning using the information regarding the model received from the model access unit 16a and the training data received from the labeling unit 15a and generates a new drift compatible model. The generated drift compatible model is registered to the model management unit 20a by the model access unit 16a. The learning unit 17a stores the generated drift compatible model in the model storage unit 11a. In other words, for example, the learning unit 17a updates the parameter of the drift compatible model stored in the model storage unit 11a. Note that, when updating the parameter of the drift compatible model stored in the model storage unit 11a, the learning unit 17a may perform fine tuning on the drift compatible model.

The past model storage unit 21a stores the information regarding the drift compatible model and the input data distribution in association with each other.

The registration unit 22a receives the information regarding the drift compatible model and the input data distribution from the model access unit 16a and registers the received information to the past model storage unit 21a.

The comparison unit 23a receives the input data distribution from the model access unit 16a and calculates a similarity in comparison with the input data distribution stored in the past model storage unit 21a.

The selection unit 24a selects a drift compatible model that is the most similar to the input data distribution received from the model access unit 16a from the past model storage unit 21a on the basis of the similarity calculated for each drift compatible model by the comparison unit 23a. Then, the selection unit 24a transfers the information regarding the selected drift compatible model to the model access unit 16a.

Note that the classification unit 12a, the distribution information generation unit 13a, the determination unit 14a, the labeling unit 15a, the model access unit 16a, the learning unit 17a, the registration unit 22a, the comparison unit 23a, and the selection unit 24a correspond to a control unit in claims.

As described above, in the first embodiment, the distribution information generation unit 13a generates the input data distribution. Then, the comparison unit 23a compares the input data distribution generated by the distribution information generation unit 13a with the input data distribution stored in the past model storage unit 21a, and the selection unit 24a selects the most similar model on the basis of the comparison by the comparison unit 23a.

Furthermore, the labeling unit 15a labels the input data and creates training data. Then, the learning unit 17a performs learning using the model selected by the selection unit 24a and the training data created by the labeling unit 15a and generates a drift compatible model. Therefore, the learning unit 17a can perform learning at high speed and can shorten a drift compatible model update time.

Second Embodiment

Figure 2:
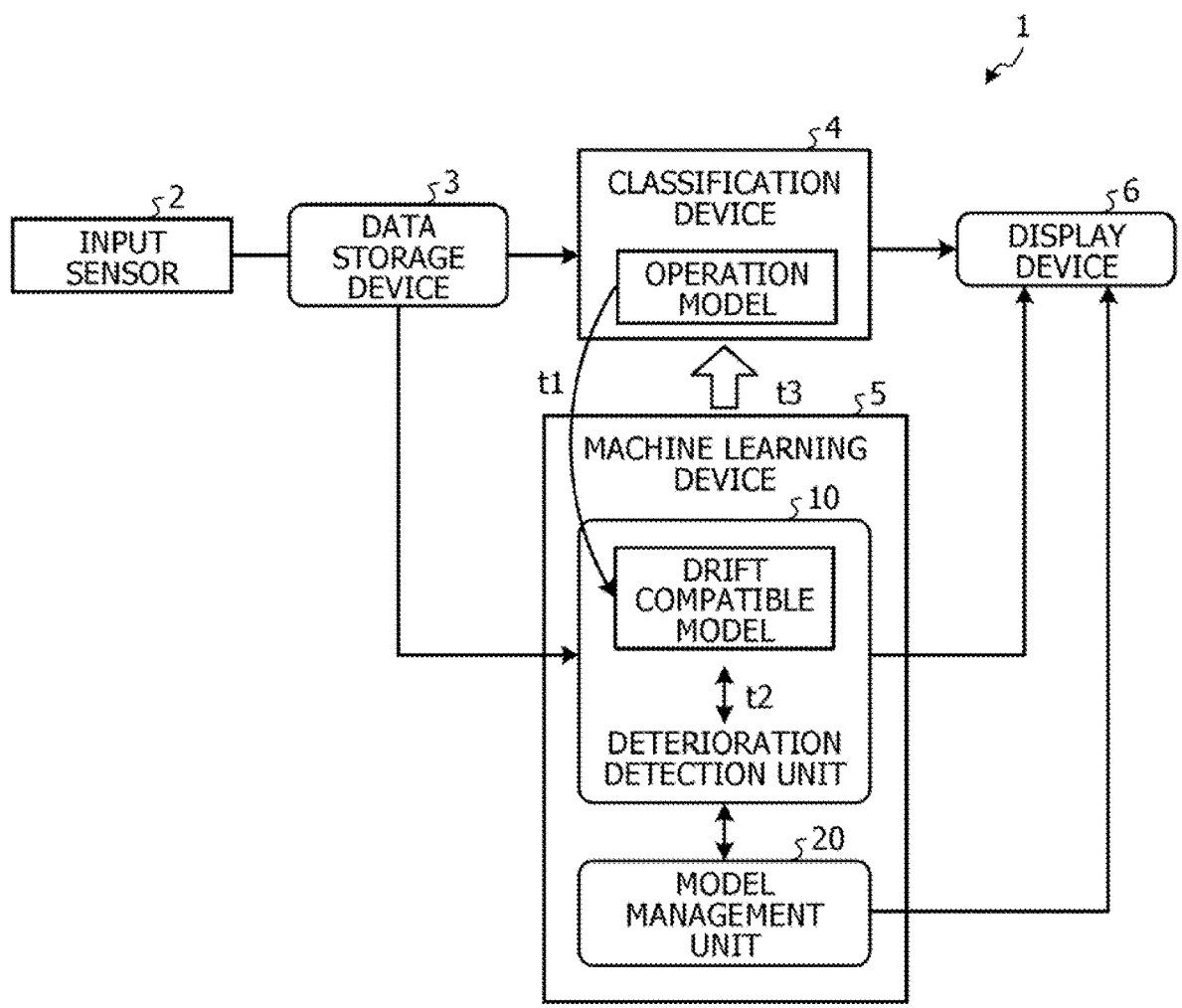
FIG. 2 is a diagram illustrating a configuration of a classification system according to a second embodiment.

First, a classification system according to a second embodiment will be described. FIG. 2 is a diagram illustrating a configuration of the classification system according to the second embodiment. As illustrated in FIG. 2, a classification system 1 according to the second embodiment includes an input sensor 2, a data storage device 3, a classification device 4, a machine learning device 5, and a display device 6.

The input sensor 2 is a sensor that acquires data to be classified. For example, in a case where images are classified, the input sensor 2 is a camera. The data storage device 3 stores the input data acquired by the input sensor 2. The data storage device 3 stores, for example, image data.

The classification device 4 is a device that classifies the input data stored in the data storage device 3 using an operation model. For example, the classification device 4 classifies images captured by the camera in real time.

The machine learning device 5 is a device that generates an operation model through machine learning using the input data stored in the data storage device 3. The machine learning device 5 includes a deterioration detection unit 10 and a model management unit 20.

Figure 3:
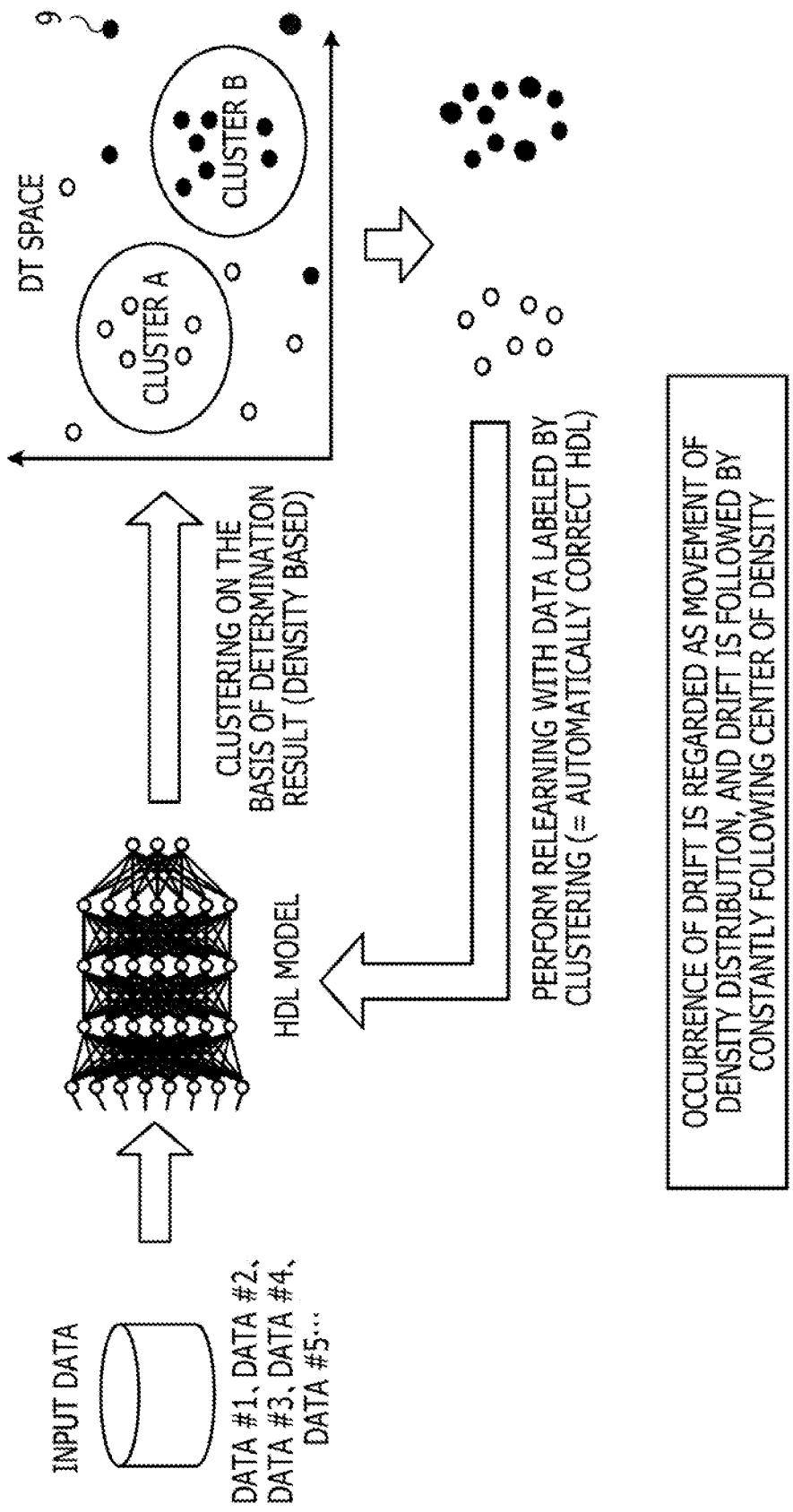
FIG. 3 is a diagram for explaining an HDL technique.

The deterioration detection unit 10 detects deterioration of the operation model on the basis of a high durability learning (HDL) technique and updates the operation model when detecting the deterioration of the operation model. The HDL is a technique for estimating accuracy deterioration of a machine learning model. FIG. 3 is a diagram for explaining the HDL technique. As illustrated in FIG. 3, the HDL technique uses an HDL model in addition to the operation model. The HDL model is a machine learning model used for the HDL technique. Furthermore, in FIG. 3, the machine learning model classifies the input data into one of two values. For example, the machine learning model input an image of a person, determines whether or not the person wears a uniform, and outputs whether or not the person wears the uniform.

First, the HDL model is created by copying the operation model. Then, as illustrated in FIG. 3, the HDL model inputs data (data #1, data #2, . . . ) input by the operation model and determines which one of two values the input data is, similarly to the operation model. The determination is made on the basis of an output value of a neuron of an output layer. A point 9 is plotted in a durable topology (DT) space on the basis of the output value of the neuron of the output layer and the determination result.

Each axis of the DT space corresponds to an output value of each neuron of the output layer. The DT space is a feature space for input data. In FIG. 3, because three neurons are included in the output layer, the DT space is a three-dimensional space. However, for convenience of explanation, the DT space is illustrated as a two-dimensional space. The determination result is represented according to types of the points 9 (○ and ●). In a case where the HDL model is not deteriorated, a group of ○ and a group of ● are separated from each other in the DT space. Note that the input data may be determined as one of three or more values.

Figure 4:
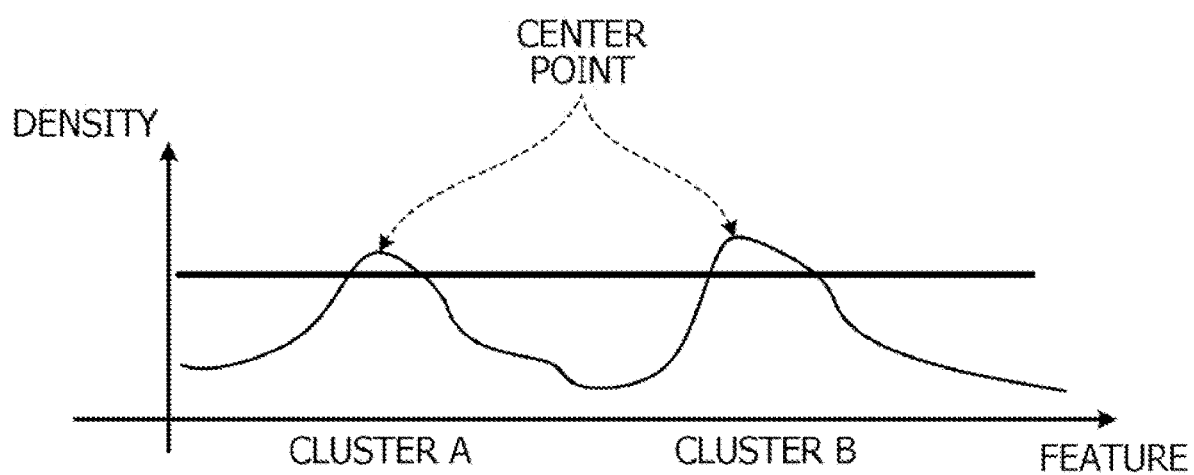
FIG. 4 is a diagram for explaining clustering based on a density.

In the HDL technique, the points 9 are clustered on the basis of the density, and a cluster A including ○ and a cluster B including ● are created. FIG. 4 is a diagram for explaining clustering on the basis of the density. The horizontal axis of FIG. 4 indicates a feature, and the vertical axis indicates a density of the points 9 (for example, the number of points 9 per unit section of feature). In FIG. 4, a distribution of a feature is illustrated. Note that, in FIG. 4, for convenience of explanation, the dimension of the DT space is set to one. As illustrated in FIG. 4, the cluster A and the cluster B are specified on the basis of the density of the feature. Each cluster is specified, for example, on the basis of the center point.

A point 9 that does not belong to both of the cluster A and the cluster B is caused by the deterioration of the HDL model. Then, in the HDL technique, relearning is performed using input data corresponding to the point 9 that belongs to the cluster A and input data corresponding to the point 9 that belongs to the cluster B as training data, and the HDL model is updated. The input data corresponding to the point 9 that belongs to the cluster A is labeled with ○, and the input data corresponding to the point 9 that belongs to the cluster B is labeled with ●.

In this way, in the HDL technique, occurrence of drift is regarded as movement of density distribution in the DT space, and the HDL model is caused to follow the drift by constantly following the center of the density. Then, when the deterioration of the operation model is detected, the operation model is replaced with the HDL model. Therefore, the HDL technique can suppress accuracy deterioration of the operation model caused by concept drift. Furthermore, in the HDL technique, the training data used for relearning is automatically labeled. Therefore, the HDL technique can suppress an increase in an operation cost.

Returning to FIG. 2, the deterioration detection unit 10 copies the operation model and stores the copied operation model as a drift compatible model (HDL model) (t1). Then, the deterioration detection unit 10 updates the drift compatible model on the basis of input data (t2). Then, when the operation model is deteriorated, the deterioration detection unit 10 copies the drift compatible model to the operation model (t3).

Figure 5B:
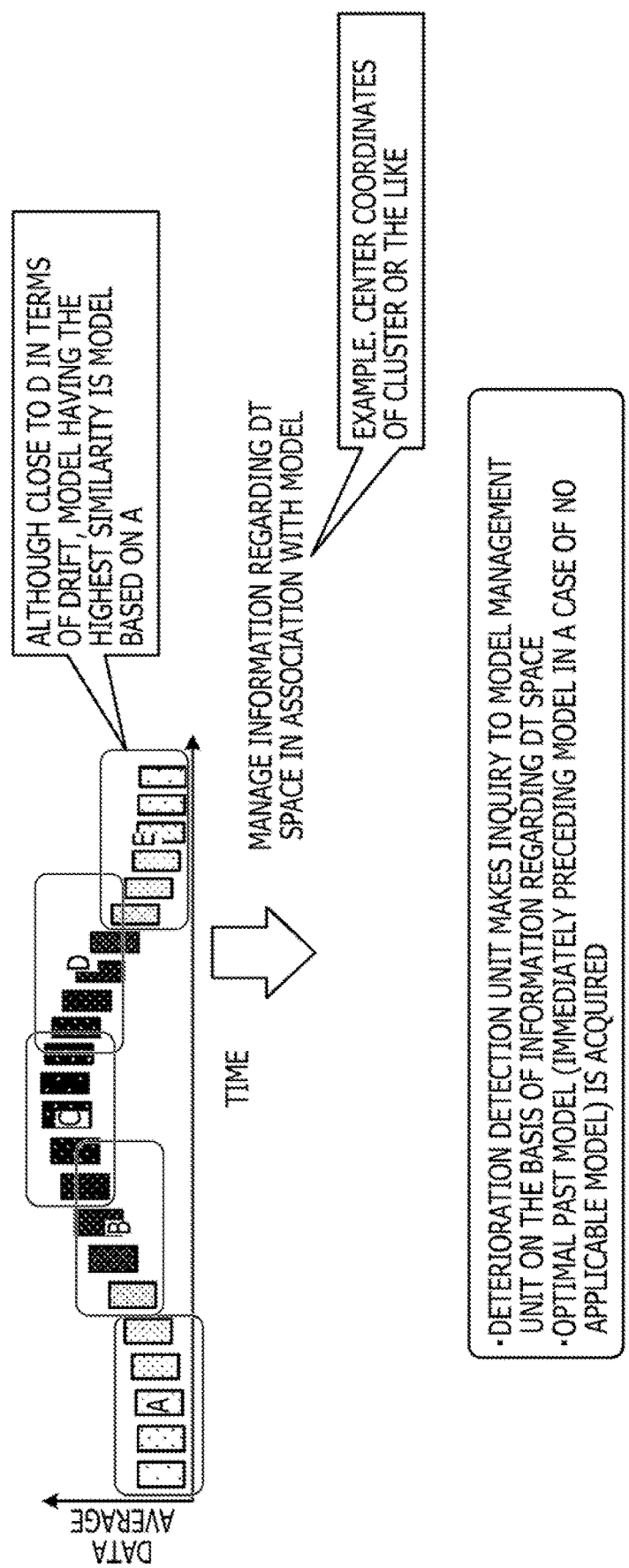
FIG. 5B is a second diagram for explaining the plurality of models managed by the model management unit.

The model management unit 20 manages the drift compatible model and the information regarding the DT space in association with each other. The model management unit 20 manages all the models used by the deterioration detection unit 10 as drift compatible models. FIGS. 5A and 5B are diagrams for explaining the plurality of models managed by the model management unit 20. As illustrated in FIG. 5A, the deterioration detection unit 10 performs classification on the basis of the drift compatible model before being updated and performs clustering on the basis of the classification result (t11). Then, the deterioration detection unit 10 extracts data near the center of the cluster as learning data (t12).

Here, because the deterioration detection unit 10 excludes data outside of the cluster in analysis in the DT space, learning data lacks. Then, the deterioration detection unit 10 uses the drift compatible model before being updated at the time of updating the drift compatible model and covers less data.

In other words, for example, the deterioration detection unit 10 creates a drift compatible model #1 using an initial model (copy of operation model) and an input data group #1 and creates a drift compatible model #2 using the drift compatible model #1 and an input data group #2. Similarly, the deterioration detection unit 10 creates a drift compatible model #3, a drift compatible model #4, . . . . Then, the model management unit 20 manages the drift compatible model #1, the drift compatible model #2, . . . respectively in association with distribution of a feature of the input data group #1, distribution of a feature of the input data group #2, . . . .

However, the immediately preceding drift compatible model is not necessarily optimal. FIG. 5B is a diagram illustrating an example in which the immediately preceding drift compatible model is not optimal. In FIG. 5B, it is assumed that the input data group drift from A, B, C, D, to E. Therefore, although the immediately preceding input data group E is close to D in terms of drift, a model that is the most similar to a model based on E is a model base on A.

Therefore, the model management unit 20 manages the information regarding the DT space (for example, center coordinates of cluster) in association with the model, and the deterioration detection unit 10 makes an inquiry to the model management unit 20 on the basis of the information regarding the DT space and acquires an optimum past model when updating the drift compatible model. Then, the deterioration detection unit 10 updates the drift compatible model on the basis of the acquired model. Note that, in a case where there is no appropriate model among past models, the deterioration detection unit 10 acquires an immediately preceding model from the model management unit 20.

Returning to FIG. 2, the display device 6 displays the classification result by the classification device 4, a message related to update of the drift compatible model and the operation model by the deterioration detection unit 10, information regarding the model managed by the model management unit 20, or the like.

Figure 6:
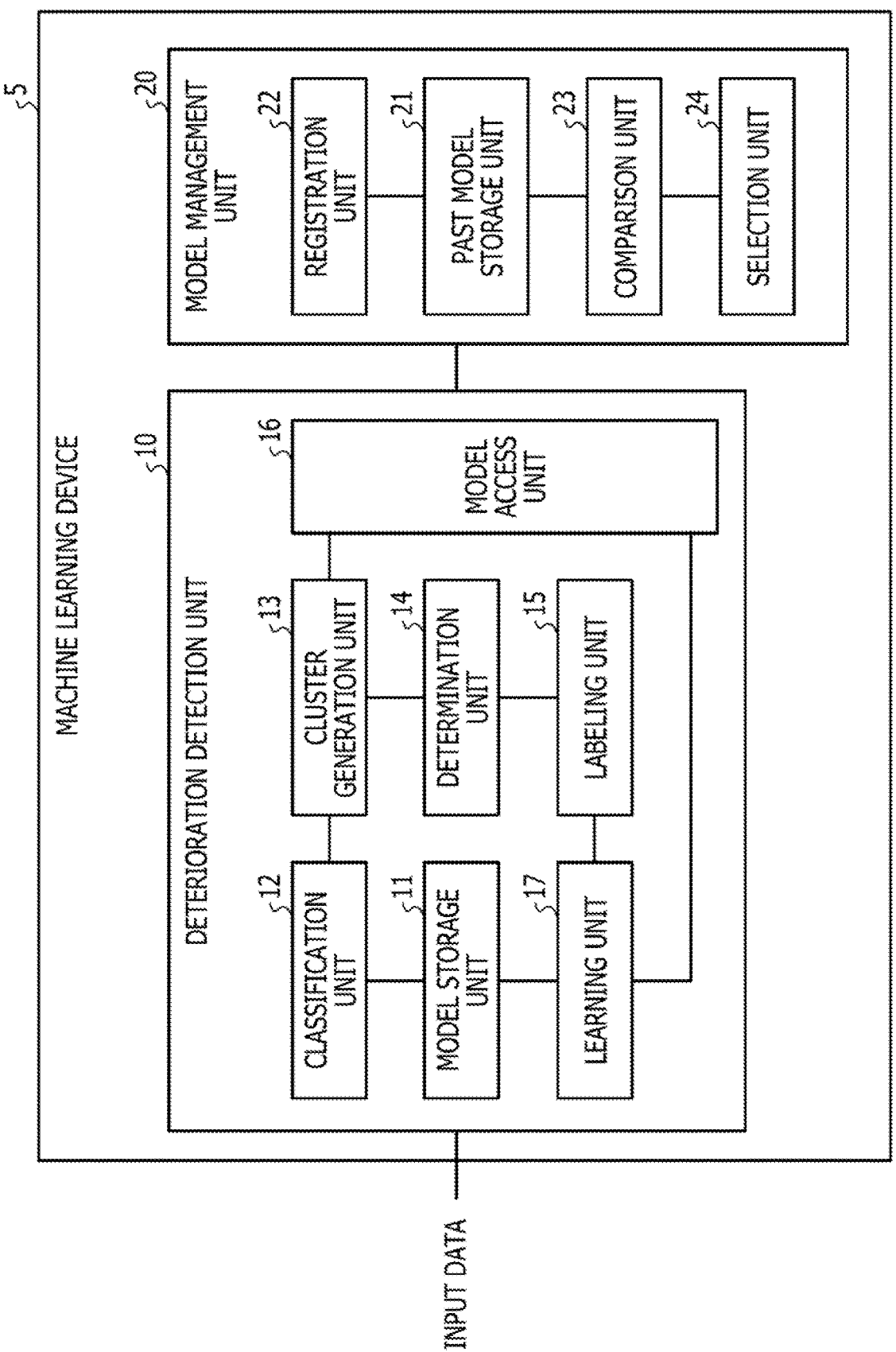
FIG. 6 is a diagram illustrating a functional configuration of a machine learning device according to the second embodiment.

Next, a functional configuration of the machine learning device 5 will be described. FIG. 6 is a diagram illustrating the functional configuration of the machine learning device 5. As illustrated in FIG. 6, the deterioration detection unit 10 includes a model storage unit 11, a classification unit 12, a cluster generation unit 13, a determination unit 14, a labeling unit 15, a model access unit 16, and a learning unit 17. The model management unit 20 includes a past model storage unit 21, a registration unit 22, a comparison unit 23, and a selection unit 24.

The model storage unit 11 stores a drift compatible model. Specifically, for example, the model storage unit 11 stores a parameter of a neural network as a drift compatible model. The parameter includes weights between neurons. The weights between the neurons are updated through learning.

The classification unit 12 classifies input data on the basis of the drift compatible model stored in the model storage unit 11. The classification unit 12 notifies the cluster generation unit 13 of the classification result and coordinates in the DT space.

The cluster generation unit 13 performs clustering on the points 9 in the DT space on the basis of the classification result by the classification unit 12 for a predetermined number of pieces (for example, 300) of input data and the coordinates in the DT space and generates a cluster. The cluster generation unit 13 specifies distribution of the points 9 in the DT space. The cluster generation unit 13 performs clustering on the basis of a density of the points 9 in the DT space. The cluster generation unit 13 generates clusters as many as the number of classified pieces by the classification unit 12. The cluster generation unit 13 specifies information regarding the cluster.

Figure 7:
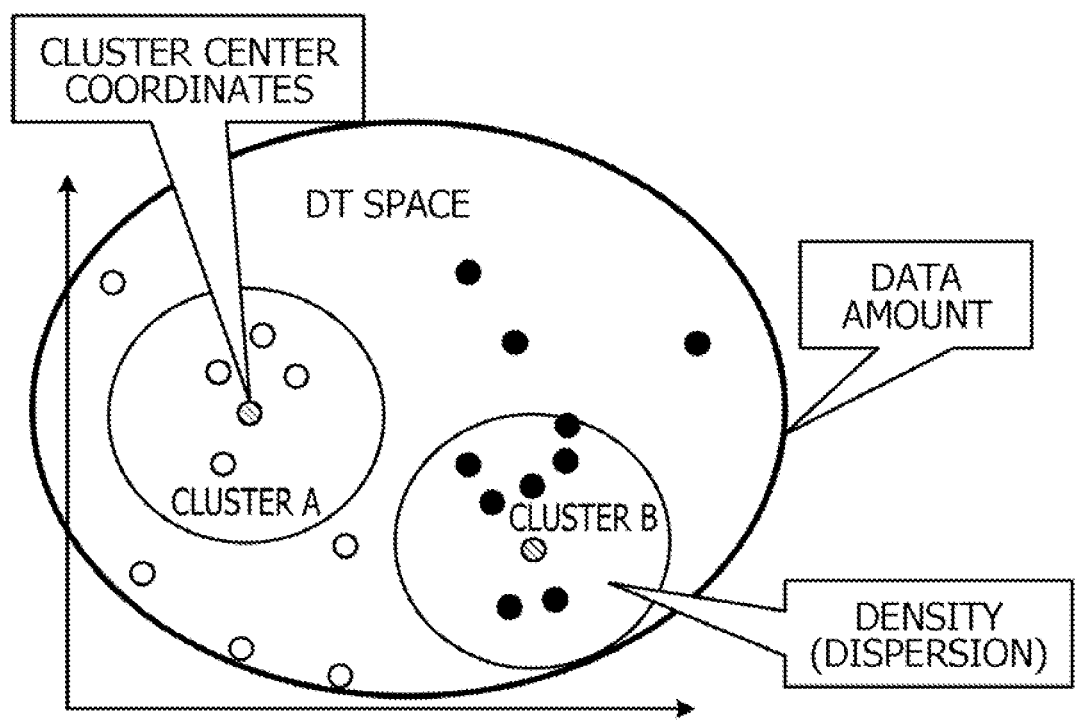
FIG. 7 is a diagram illustrating information regarding a cluster.

FIG. 7 is a diagram illustrating information regarding a cluster. As illustrated in FIG. 7, the information regarding the cluster includes center coordinates of the cluster, the density of the cluster (dispersion), and a data amount (the number of pieces of input data). The information regarding the cluster indicates distribution of a feature of the input data.

The determination unit 14 determines whether or not the drift compatible model needs to be updated on the basis of the information regarding the cluster generated by the cluster generation unit 13 and instructs the learning unit 17 to perform learning in a case of determining that the update is needed. For example, the determination unit 14 determines whether or not the drift compatible model needs to be updated on the basis of a ratio of input data that does not belong to any cluster.

In a case where the determination unit 14 determines that the drift compatible model needs to be updated, the labeling unit 15 adds a classification result corresponding to the cluster to the input data corresponding to the point 9 that belongs to one cluster as a label (correct answer) and creates training data. Then, the labeling unit 15 transfers the created training data to the learning unit 17.

The model access unit 16 accesses the model management unit 20. The model access unit 16 specifies the information regarding the cluster generated by the cluster generation unit 13, inquires a model similar to the information regarding the cluster to the model management unit 20, and transfers information regarding the model acquired from the model management unit 20 as a response, to the learning unit 17.

Furthermore, the model access unit 16 requests the model management unit 20 to register the information regarding the cluster generated by the cluster generation unit 13 in association with the information regarding the drift compatible model generated by the learning unit 17.

The learning unit 17 performs learning using the information regarding the model received from the model access unit 16 and the training data received from the labeling unit 15 and generates a new drift compatible model. The generated drift compatible model is registered to the model management unit 20 by the model access unit 16. The learning unit 17 stores the generated drift compatible model in the model storage unit 11. In other words, for example, the learning unit 17 updates the parameter of the drift compatible model stored in the model storage unit 11. Note that, when updating the parameter of the drift compatible model stored in the model storage unit 11, the learning unit 17 may perform fine tuning on the drift compatible model.

The past model storage unit 21 stores the information regarding the drift compatible model in association with the information regarding the cluster. FIG. 8 is a diagram illustrating an example of the past model storage unit 21. As illustrated in FIG. 8, the past model storage unit 21 stores HDL information in association with a model identifier for each drift compatible model. The HDL information includes a data amount, density information, and cluster center coordinates. The model identifier is an identifier to identify a drift compatible model. The model management unit 20 separately stores information such as a parameter included in the drift compatible model and the identifier in association with each other.

The data amount is the number of pieces of input data. The density information is a density (dispersion) of a cluster. The cluster center coordinates are coordinates at the center of a cluster. For example, in a drift compatible model identified by "model20200618.model", the number of pieces of input data is "300". Furthermore, in the drift compatible model identified by "model20200618.model", densities of two clusters are "0.823" and "0.74", and the cluster center coordinates of the two clusters are (0.3, 0.5) and (0.7, 0.2).

The registration unit 22 receives the information regarding the drift compatible model and the information regarding the cluster from the model access unit 16 and registers the received information to the past model storage unit 21.

The comparison unit 23 receives the information regarding the cluster from the model access unit 16 and calculates a similarity by comparing the received information with the information regarding each cluster stored in the past model storage unit 21. Specifically, for example, the comparison unit 23 normalizes the HDL information in column unit and calculates the similarity.

The selection unit 24 selects a drift compatible model of which the HDL information is the most similar to the information regarding the cluster received from the model access unit 16 from the past model storage unit 21 on the basis of the similarity calculated by the comparison unit 23 for each drift compatible model. Then, the selection unit 24 transfers the information regarding the selected drift compatible model to the model access unit 16.

Note that the classification unit 12, the cluster generation unit 13, the determination unit 14, the labeling unit 15, the model access unit 16, the learning unit 17, the registration unit 22, the comparison unit 23, and the selection unit 24 correspond to a control unit in claims.

Figure 9:
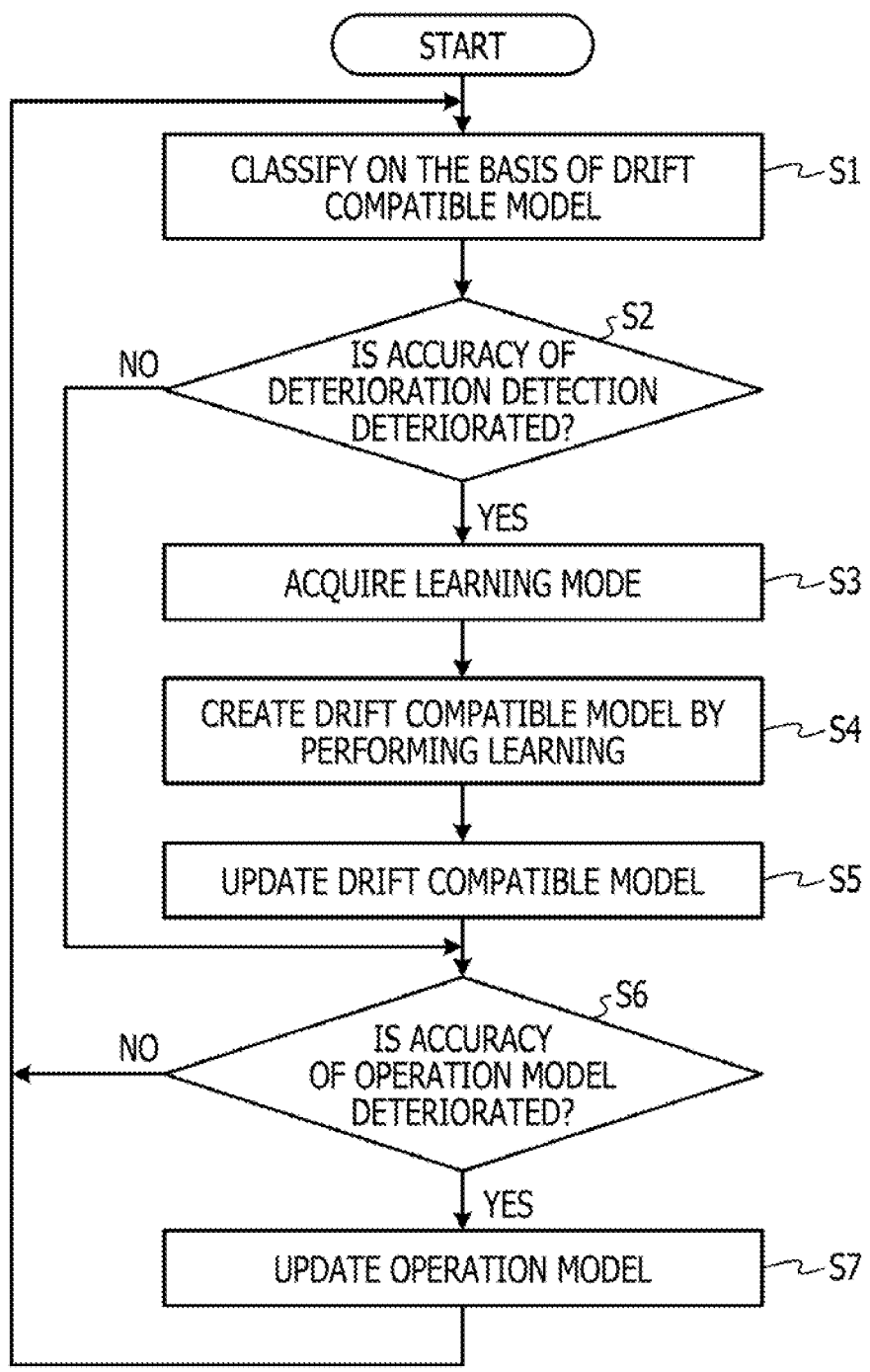
FIG. 9 is a flowchart illustrating a flow of processing by a deterioration detection unit.

Next, a flow of processing of the deterioration detection unit 10 will be described. FIG. 9 is a flowchart illustrating the flow of the processing of the deterioration detection unit 10. As illustrated in FIG. 9, the deterioration detection unit 10 performs classification on the basis of the drift compatible model using the input data input by the operation model (step S51). Then, the deterioration detection unit 10 performs clustering on the basis of the classification result and the feature of the input data and determines whether or not accuracy of deterioration detection is deteriorated on the basis of the information regarding the cluster (step S2). Here, the deterioration of the accuracy of the deterioration detection means that accuracy of the drift compatible model is deteriorated. Then, in a case where the accuracy of the deterioration detection is not deteriorated, the deterioration detection unit 10 proceeds to step S6.

On the other hand, in a case where the accuracy of the deterioration detection is deteriorated, the deterioration detection unit 10 acquires a learning model from the model management unit 20 (step S3). Here, the deterioration detection unit 10 acquires a drift compatible model in the past having the similar feature of the input data on the basis of the information regarding the cluster as a learning model. Then, the deterioration detection unit 10 creates a drift compatible model by performing learning using the acquired drift compatible model and the input data that belongs to any one of the clusters (step S4) and updates the drift compatible model (step S5).

Then, the deterioration detection unit 10 determines whether or not accuracy of the operation model is deteriorated (step S6). In a case where the accuracy is not deteriorated, the procedure returns to step S1, and in a case where the accuracy is deteriorated, the operation model is updated using the drift compatible model (step S7), and the procedure returns to step S1.

In this way, because the deterioration detection unit 10 performs learning using the drift compatible model in the past having the similar feature of the input data, the deterioration detection unit 10 can perform learning at high speed.

Figure 10:
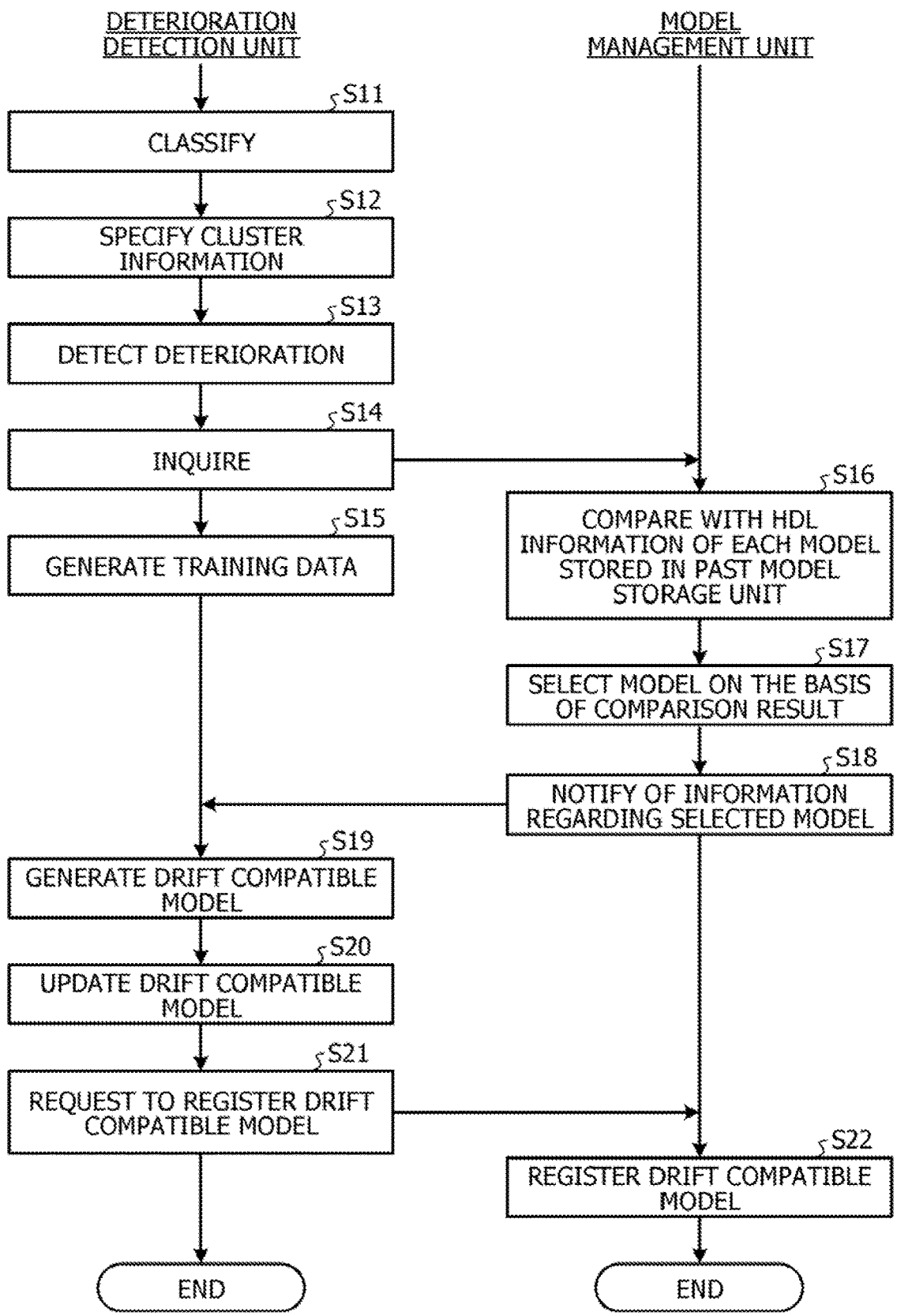
FIG. 10 is a diagram illustrating a sequence of processing for updating a drift compatible model.

FIG. 10 is a diagram illustrating a sequence of processing for updating a drift compatible model. As illustrated in FIG. 10, the deterioration detection unit 10 performs classification on the basis of the drift compatible model using input data input by the operation model (step S11). Then, the deterioration detection unit 10 generates a cluster on the basis of the classification result and the coordinates in the DT space and specifies information regarding the cluster (step S12). In other words, for example, the deterioration detection unit 10 specifies distribution of a feature of the input data calculated by the drift compatible model.

Then, the deterioration detection unit 10 detects deterioration of the drift compatible model (step S13) and inquires the model management unit 20 for a similar model as specifying the information regarding the cluster (step S14). Then, the deterioration detection unit 10 generates training data using the input data that belongs to any one of the clusters (step S15).

Upon receiving the inquiry from the deterioration detection unit 10, the model management unit 20 compares the information regarding the cluster specified by the deterioration detection unit 10 with the HDL information of each model stored in the past model storage unit 21 (step S16). In other words, for example, the model management unit 20 compares the distribution of the feature of the input data with distribution of the feature of the training data used when each model stored in the past model storage unit 21 is generated. Then, the model management unit 20 selects a model on the basis of the comparison result (step S17). Then, the model management unit 20 notifies the deterioration detection unit 10 of information regarding the selected model (step S18)

The deterioration detection unit 10 generates a new drift compatible model by updating a parameter of the notified model on the basis of the training data (step S19) and updates the drift compatible model of the model storage unit 11 with the generated drift compatible model (step S20). Then, the deterioration detection unit 10 requests the model management unit 20 to register the drift compatible model (step S21). Then, the model management unit 20 registers the requested drift compatible model (step S22).

In this way, because the model management unit 20 selects a model on the basis of the information regarding the cluster specified by the deterioration detection unit 10 and the HDL information, the deterioration detection unit 10 can perform learning at high speed using the model selected by the model management unit 20.

As described above, in the second embodiment, the classification unit 12 classifies the input data on the basis of the drift compatible model stored in the model storage unit 11, and the cluster generation unit 13 generates a cluster on the basis of the classification result by the classification unit 12 and the coordinates in the DT space. Then, the comparison unit 23 compares the information regarding the cluster generated by the classification unit 12 with the HDL information stored in the past model storage unit 21, and the selection unit 24 selects the most similar model on the basis of the comparison by the comparison unit 23. Furthermore, the labeling unit 15 labels the input data classified into any one of the clusters generated by the classification unit 12 and generates training data. Then, the learning unit 17 performs learning using the model selected by the selection unit 24 and the training data created by the labeling unit 15 and generates a drift compatible model. Therefore, the learning unit 17 can perform learning at high speed and can shorten a drift compatible model update time.

Furthermore, in the second embodiment, the model access unit 16 requests the model management unit 20 to register the drift compatible model generated by the learning unit 17, and the registration unit 22 registers the drift compatible model of which the registration is requested to the past model storage unit 21. Therefore, the machine learning device 5 can accumulate the drift compatible models and can perform learning using the drift compatible models having high similarity.

Furthermore, in the second embodiment, because the machine learning device 5 uses the center coordinates and the density of the cluster as the information regarding the cluster, the machine learning device 5 can accurately select the similar model from the past model storage unit 21.

Note that, in the first and second embodiments, the machine learning devices 5a and 5 have been described. However, a machine learning program having the similar function can be obtained by implementing the configurations of the machine learning devices 5a and 5 by software. Therefore, a computer that executes the machine learning program will be described.

Figure 11:
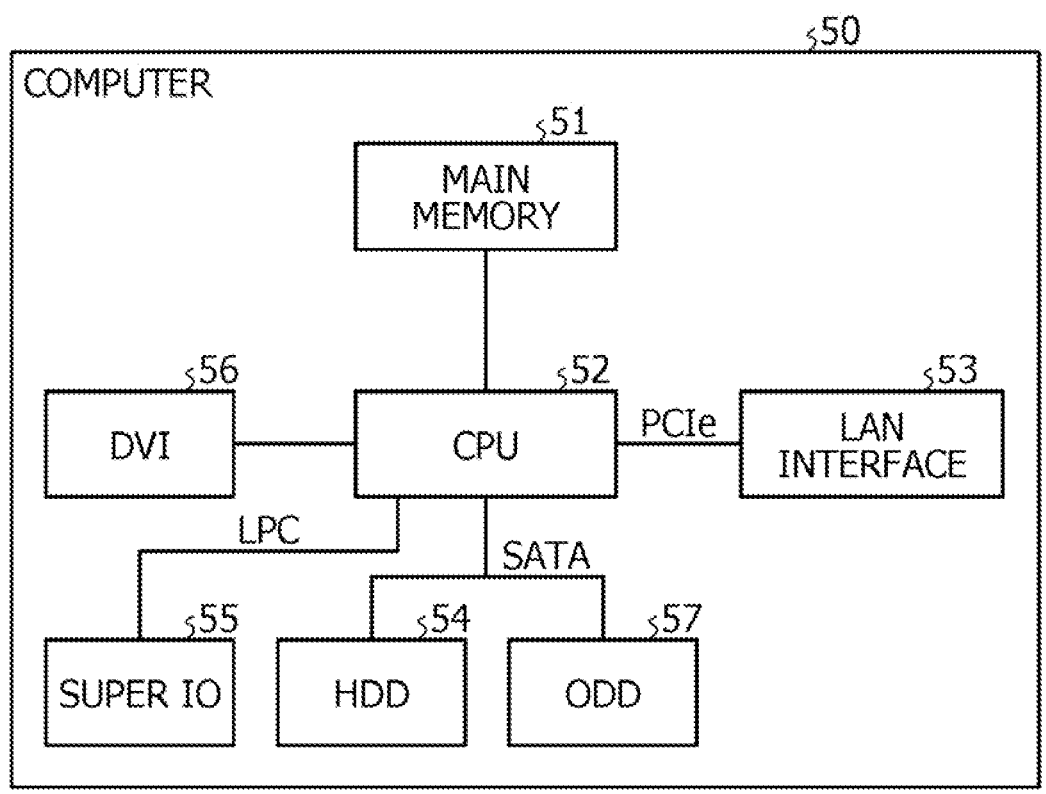
FIG. 11 is a diagram illustrating a hardware configuration of a computer that executes a machine learning program according to the first and second embodiments.
Figure 12A:
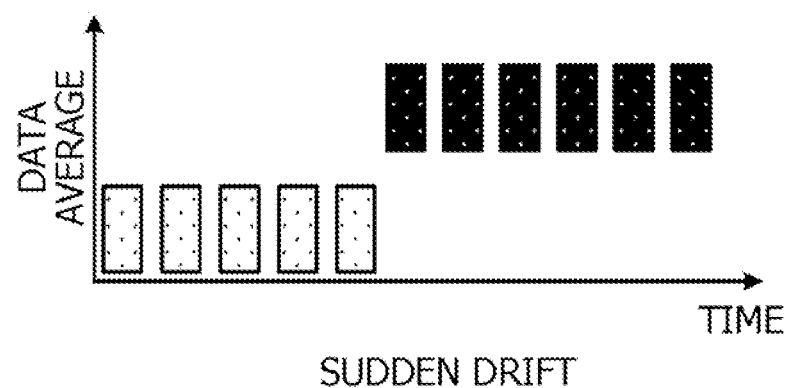
FIGS. 12A, 12B, and 12C are diagrams for explaining concept drift.
Figure 12B:
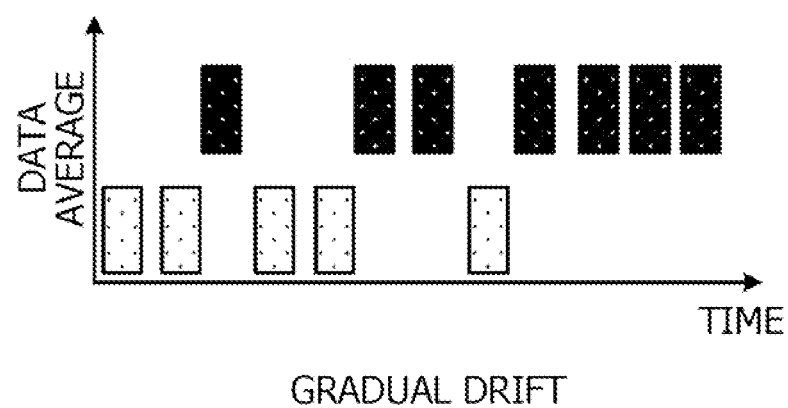
Figure 12C:
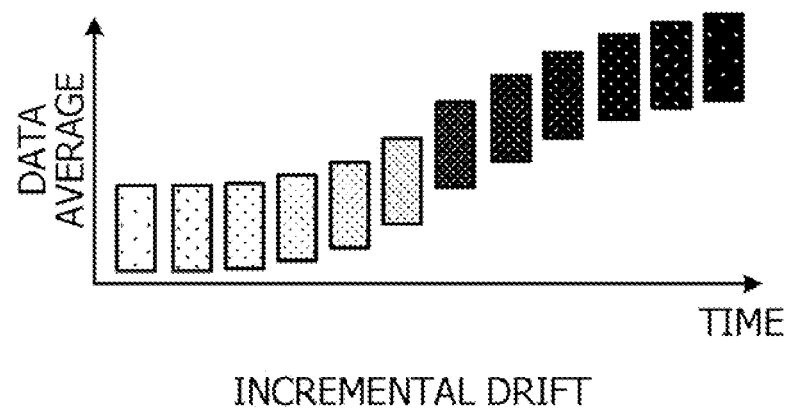

FIG. 11 is a diagram illustrating a hardware configuration of a computer that executes a machine learning program according to the first and second embodiments. As illustrated in FIG. 11, a computer 50 includes a main memory 51, a central processing unit (CPU) 52, a local area network (LAN) interface 53, and a hard disk drive (HDD) 54. Furthermore, the computer 50 includes a super input output (IO) 55, a digital visual interface (DVI) 56, and an optical disk drive (ODD) 57.

The main memory 51 is a memory that stores a program, a halfway result of execution of the program, and the like. The CPU 52 is a central processing unit that reads a program from the main memory 51 and executes the program. The CPU 52 includes a chipset having a memory controller.

The LAN interface 53 is an interface for connecting the computer 50 to another computer via a LAN. The HDD 54 is a disk device that stores a program and data, and the super IO 55 is an interface for connecting an input device such as a mouse or a keyboard. The DVI 56 is an interface that connects a liquid crystal display device, and the ODD 57 is a device that performs reading and writing from and to a digital versatile disc (DVD).

The LAN interface 53 is connected to the CPU 52 by peripheral component interconnect express (PCIe), and the HDD 54 and the ODD 57 are connected to the CPU 52 by serial advanced technology attachment (SATA). The super IO 55 is connected to the CPU 52 by low pin count (LPC).

Then, the machine learning program executed by the computer 50 is stored in a DVD that is an example of a recording medium that may be read by the computer 50, and is read from the DVD by the ODD 57 to be installed to the computer 50. Alternatively, the machine learning program is stored in a database or the like of another computer system connected via the LAN interface 53 and is read from the database or the like and is installed to the computer 50. Then, the installed machine learning program is stored in the HDD 54, read to the main memory 51, and executed by the CPU 52.

Furthermore, in the first and second embodiments, a case has been described where the neural network is used for the machine learning model. However, the machine learning devices 5a and 5 may use another machine learning model. Furthermore, in the first and second embodiments, a case has been described where the input data is classified on the basis of the machine learning model. However, an alternative system of the classification system 1 may perform determination and prediction on the basis of the machine learning model. Furthermore, in the first and second embodiments, a case has been described where the output value of the neuron of the output layer is used as the feature of the input data. However, the machine learning devices 5a and 5 may use another value as the feature of the input data. Furthermore, in the second embodiment, a case has been described where the center coordinates and the density of the cluster are used. However, the machine learning device 5 may use another piece of information as the information indicating the distribution of the feature of the input data. Furthermore, in the first and second embodiments, a case has been described where the drift compatible model is updated. However, the machine learning devices 5a and 5 may use a machine learning model in the past other than the drift compatible model.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a machine learning program that causes at least one computer to execute a process, the process comprising:
  generating a plurality of machine learning models that includes a neural network by updating a parameter of a first machine learning model by using training data;
  acquiring data by an image sensor;
  specifying first distribution of a feature of data calculated by a second machine learning model out of the plurality of the machine learning models according to an input of data to the second machine learning model, the feature being a value output by a neuron of an output layer of the neural network;

determining whether or not output accuracy of the second machine learning model decreases based on the first distribution;

when the determining determines that the output accuracy does not decrease, generating a third machine learning model to use for a machine learning by updating a parameter of the second machine learning model based on a certain piece of the training data labeled based on the feature of the data; and when the determining determines that the output accuracy decreases, selecting, from the plurality of machine learning models, a fourth machine learning model that has second distribution of a feature of data input that is the most similar with third distribution of a feature of the training data among the plurality of the machine learning model, and generating the third machine learning model by updating a parameter of the fourth machine learning model based on a certain piece of the training data labeled based on the feature of the data.

2. The non-transitory computer-readable storage medium according to claim 1, wherein the selecting includes referring to model information that includes the plurality of machine learning models, wherein the process further comprising adding the third machine learning model to the model information in association with fourth distribution of a feature of the certain piece.

3. The non-transitory computer-readable storage medium according to claim 1, wherein the first distribution includes center coordinates and a density of a cluster created by clustering the data based on an output of the second machine learning model input the data and the feature of the data, and the selecting includes respectively comparing the center coordinates and the density of the first distribution with center coordinates and a density of the cluster associated with each of the plurality of machine learning models.

4. A machine learning method for a computer to execute a process comprising:

generating a plurality of machine learning models that includes a neural network by updating a parameter of a first machine learning model by using training data;

acquiring data by an image sensor;

specifying first distribution of a feature of data calculated by a second machine learning model out of the plurality of the machine learning models according to an input of data to the second machine learning model, the feature being a value output by a neuron of an output layer of the neural network;

determining whether or not output accuracy of the second machine learning model decreases based on the first distribution;

when the determining determines that the output accuracy does not decrease, generating a third machine learning model to use for a machine learning by updating a parameter of the second machine learning model based on a certain piece of the training data labeled based on the feature of the data; and when the determining determines that the output accuracy decreases, selecting, from the plurality of machine learning models, a fourth machine learning model that has second distribution of a feature of data input that is the most similar with third distribution of a feature of the training data among the plurality of the machine learning model, and generating the third machine learning model by updating a parameter of the fourth machine learning model based on a certain piece of the training data labeled based on the feature of the data.

5. The machine learning method according to claim 4, wherein the selecting includes referring to model information that includes the plurality of machine learning models, wherein the process further comprising adding the third machine learning model to the model information in association with fourth distribution of a feature of the certain piece.

6. The machine learning method according to claim 4, wherein the first distribution includes center coordinates and a density of a cluster created by clustering the data based on an output of the second machine learning model input the data and the feature of the data, and the selecting includes respectively comparing the center coordinates and the density of the first distribution with center coordinates and a density of the cluster associated with each of the plurality of machine learning models.

7. A machine learning device comprising:

an image sensor;

one or more memories; and one or more processors coupled to the one or more memories and the one or more processors configured to specify first distribution of a feature of data acquired by the image sensor, the feature being a value output by a neuron of an output layer of a neural network and being calculated by a second machine learning model out of the plurality of the machine learning models that includes the neural network according to an input of data to the second machine learning model;

determine whether or not output accuracy of the second machine learning model decreases based on the first distribution;

when the determining determines that the output accuracy does not decrease, generate a third machine learning model to use for a machine learning by updating a parameter of the second machine learning model based on a certain piece of the training data labeled based on the feature of the data; and when the determining determines that the output accuracy decreases, select, from the plurality of machine learning models, a fourth machine learning model that has second distribution of a feature of data input that is the most similar with third distribution of a feature of the training data among the plurality of the machine learning model, and generate the third machine learning model by updating a parameter of the fourth machine learning model based on a certain piece of the training data labeled based on the feature of the data.

8. The machine learning device according to claim 7, wherein the one or more processors is further configured to:

refer to model information that includes the plurality of machine learning models, add the third machine learning model to the model information in association with fourth distribution of a feature of the certain piece.

9. The machine learning device according to claim 7, wherein the first distribution includes center coordinates and a density of a cluster created by clustering the data based on an output of the second machine learning model input the data and the feature of the data, wherein the one or more processors is further configured to respectively compare the center coordinates and the density of the first distribution with center coordinates and a density of the cluster associated with each of the plurality of machine learning models.

* * * * *